United States Patent
Kohata et al.

(10) Patent No.: US 8,727,589 B2
(45) Date of Patent: May 20, 2014

(54) VEHICULAR LAMP, VEHICULAR COMPONENT PART FOR USE IN THE SAME, AND METHOD OF PRODUCING THE VEHICULAR COMPONENT

(75) Inventors: Takahiro Kohata, Shizuoka (JP); Toshimasa Ikeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 95 days.

(21) Appl. No.: 13/590,452

(22) Filed: Aug. 21, 2012

(65) Prior Publication Data
US 2013/0051052 A1 Feb. 28, 2013

(30) Foreign Application Priority Data
Aug. 22, 2011 (JP) ................. 2011-180870

(51) Int. Cl.
*F21V 7/00* (2006.01)
(52) U.S. Cl.
USPC ............ 362/516; 362/507; 362/518; 264/1.9; 264/328.7; 249/114.1

(58) Field of Classification Search
USPC ............ 362/507, 518, 520, 516; 264/1.1, 1.9, 264/542, 808; 249/114.1
See application file for complete search history.

(56) References Cited

U.S. PATENT DOCUMENTS

| 6,746,634 | B2 * | 6/2004 | Shimakura | ..................... 264/1.9 |
| 7,018,576 | B2 * | 3/2006 | Kosuge et al. | ................. 264/132 |

FOREIGN PATENT DOCUMENTS

JP 2008-071556 A 3/2008

* cited by examiner

*Primary Examiner* — Ali Alavi
(74) *Attorney, Agent, or Firm* — Sughrue Mion, PLLC (57) ABSTRACT

A vehicular lamp includes a vehicular component part that is molded by charging molten resin into a cavity defined by a first die that has a mirror surface-molding portion and a semi-gloss surface-molding portion and a second die that is movable relative to the first die and cooling the molten resin. The vehicular component part includes a mirror surface-formed portion having a mirror surface that is formed by the mirror surface-molding portion and a semi-gloss surface-formed portion having a semi-gloss surface that is formed by the semi-gloss surface-molding portion. A step surface is provided between the mirror surface and the semi-gloss surface of the vehicular component part. The semi-gloss surface-formed portion is protruded on a first die side relative to the mirror surface-formed portion.

19 Claims, 8 Drawing Sheets

| PASSED/NOT PASSED | EVALUATION RANK | EXTERNAL APPEARANCE OF GRAIN (LINE MARKING (SCORING) ON GRAINED SURFACE) |
|---|---|---|
| PASSED: ○ | 5 | NONE |
| | 4 | INVISIBLE AT DISTANCE OF 0.1 m OR MORE |
| | 3 | INVISIBLE AT DISTANCE OF 0.3 m OR MORE |
| NOT PASSED: × | 2 | INVISIBLE AT DISTANCE OF 0.5 m OR MORE |
| | 1 | INVISIBLE AT DISTANCE OF 1.0 m OR MORE |

VEHICULAR LAMP, VEHICULAR COMPONENT PART FOR USE IN THE SAME, AND METHOD OF PRODUCING THE VEHICULAR COMPONENT

INCORPORATION BY REFERENCE

The disclosure of Japanese Patent Application No. 2011-180870 filed on Aug. 22, 2011 including the specification, drawings and abstract is incorporated herein by reference in its entirety.

BACKGROUND OF THE INVENTION

1. Field of the Invention

The invention relates to a vehicular lamp, a vehicular component part for use in the vehicular lamp, and a method of producing the vehicular component part. More particularly, the invention relates to a technical field for securing a good molded state of a vehicular component part.

2. Description of Related Art

In some vehicular lamps, predetermined various parts are disposed inside an outer lamp casing that is constructed of, for example, a cover and a lamp housing. In such a vehicular lamp, a vehicular component part molded of resin through the use of a molding die that includes a movable die and a stationary die is used as a component part that constitutes the vehicular lamp.

The vehicular component parts made of resin include, for example, an extension that shields portions of various component parts disposed inside an outer lamp casing so that the extension improves an appearance that is visually perceived from outside, a reflector that reflects light emitted from a light source, etc.

In some of such vehicular lamps, a surface of a vehicular component part as described above is provided with mirror surfaces and semi-gloss surfaces (grained surfaces) (see, e.g., Japanese Patent Application Publication No. 2008-71556 (JP 2008-71556 A)). The mirror surfaces and the semi-gloss surfaces are formed by printing molding surfaces of mirror surface-molding portions and molding surfaces of semi-gloss surface-molding portions, respectively, which are provided on a stationary die.

In the case where mirror surfaces and semi-gloss surfaces are formed in a mixed arrangement as a surface of a vehicular component part, the semi-gloss surfaces restrain the overall shiny appearance of the vehicular component part so that the vehicular component part is provided with a luxurious appearance, in comparison with the case where the surface of the vehicular component part is formed only by mirror surfaces.

A semi-gloss surface (grained surface) as mentioned above is formed by printing the shapes of a plurality of protrusions formed on the molding surface of a semi-gloss surface-molding portion of the stationary die onto a surface of a molten resin. Therefore, when the vehicular component part is separated from the stationary die when the movable die and the stationary die are separated from each other, protrusions of semi-gloss surface-molding portions of the stationary die can sometimes contact semi-gloss surfaces of the vehicular component, resulting in formation of scratch wound-like line marking that is termed scoring (or gnawing) on the semi-gloss surfaces. If this occurs, the molded state of the vehicular component part will likely be degraded.

The smaller the draft angle of a stationary die for a corresponding vehicular component part is, the more such line marking (scoring) is likely to occur. Therefore, in order to prevent occurrence of line marking, it is desirable to increase the draft angle of the stationary die for the vehicular component part.

However, if the draft angle is increased, for example, in the case where the vehicular component part is an extension, the opening portion positioned in alignment with an opening face of the reflector reduces in size and the reflector becomes correspondingly smaller, so that it can become difficult to secure a sufficient amount of reflecting light from the reflector or having other drawbacks.

SUMMARY OF THE INVENTION

The invention provides a vehicular lamp, a vehicular component part for use in the vehicular lamp, and a method of producing the vehicular component part that make it possible to secure a good molded state of a vehicular component part without a need to increase the draft angle of a die for the vehicular component part.

A vehicular lamp in accordance with a first aspect of the invention includes a vehicular component part that is molded by charging molten resin into a cavity defined by a first die that has a mirror surface-molding portion and a semi-gloss surface-molding portion and a second die that is movable relative to the first die and cooling the molten resin. The vehicular component part includes a mirror surface-formed portion having a mirror surface that is formed by the mirror surface-molding portion and a semi-gloss surface-formed portion having a semi-gloss surface that is formed by the semi-gloss surface-molding portion. A step surface is provided between the mirror surface and the semi-gloss surface of the vehicular component part. The semi-gloss surface-formed portion is protruded on a first die side relative to the mirror surface-formed portion.

Therefore, in the vehicular lamp in accordance with the first aspect of the invention, the mirror surface-formed portion of the vehicular component part (in the molding die) shrinks in such a direction that the mirror surface is pressed against the mirror surface-molding portion of the first die, and the semi-gloss surface-formed portion of the vehicular component part shrinks in such a direction that the semi-gloss surface departs from the semi-gloss surface-molding portion of the first die.

Therefore, since, when the molten resin cools, the semi-gloss surface-formed portion of the vehicular component part shrinks so that the surface of the semi-gloss surface-formed portion departs from the semi-gloss surface-molding surface of the first die, the contact of the semi-gloss surface with protrusions provided on the semi-gloss surface-molding surface of the first die at the time of separation between the first die and the second die is less likely to occur and therefore the scoring, that is, the line marking, is less likely to occur. Thus, a good molded state of the vehicular component part can be secured without increasing the draft angle of the first die for the vehicular component part.

A vehicular component part that is made of resin and for use in a vehicular lamp in accordance with a second aspect of the invention includes an annular portion including a mirror surface-formed portion whose inner surface is a mirror surface and a semi-gloss surface-formed portion whose inner surface is a semi-gloss surface. A step surface is provided between the mirror surface and the semi-gloss surface. The semi-gloss surface-formed portion is protruded relative to the mirror surface-formed portion.

A method of producing a vehicular component part for use in a vehicular lamp in accordance with a third aspect of the invention includes: charging molten resin into a cavity defined by a first die that has a semi-gloss surface-molding portion and a mirror surface-molding portion and a second die that is movable relative to the first die; and removing a molding that is the vehicular component part from the first die and the second die after the molten resin is cooled. In the method, a step surface-molding portion that forms a step surface between the mirror surface and the semi-gloss surface of the vehicular component part is provided between the mirror surface-molding portion and the semi-gloss surface-molding portion of the first die, and the mirror surface-molding portion of the first die is protruded relative to the semi-gloss surface-molding portion of the first die.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of a vehicular lamp of the invention will be described with reference to the accompanying drawings.

Figure 1:
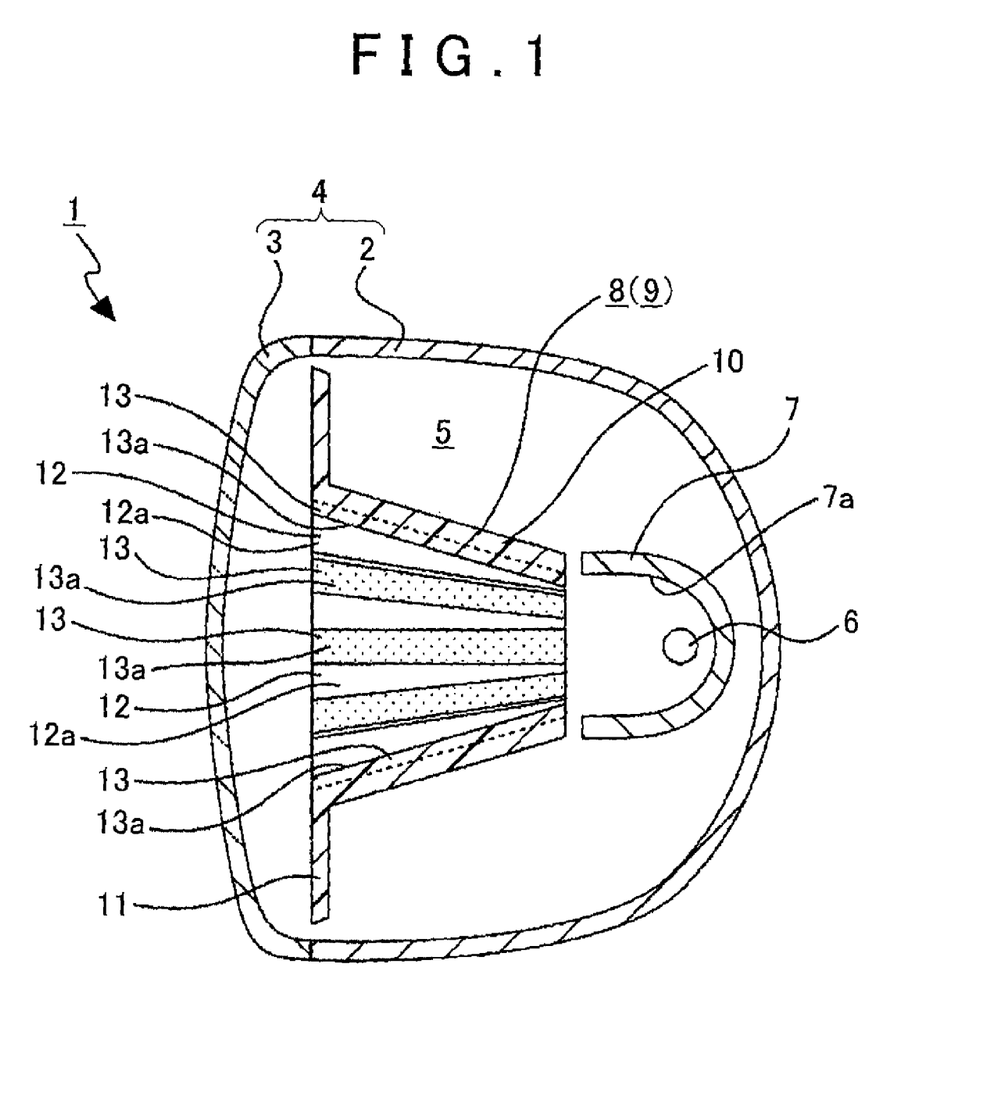
FIG. 1 is a general longitudinal sectional view of a vehicular lamp in accordance with an embodiment of the invention.

As shown in FIG. 1, a vehicular lamp 1 includes a lamp housing 2 that has a recess portion that is open forward, and a cover 3 that closes an opening face of the lamp housing 2. The lamp housing 2 and the cover 3 constitute an outer lamp casing 4. An internal space of the outer lamp casing 4 is formed as a lamp chamber 5.

In the lamp chamber 5, there are disposed a light source 6 that emits light, a reflector 7 that reflects light emitted from the light source 6, and an extension 8 that shields portions of various component parts disposed inside the lamp chamber 5.

It is to be noted that FIG. 1 shows the extension 8 in an enlarged view and shows the extension 8 as having a simple structure to facilitate the understanding.

The reflector 7 has a generally concave shape that is open to one side, and an internal surface of the reflector 7 is formed as a reflective surface 7a.

The extension 8 is provided as a vehicular component part 9 that is formed of a resin material. The extension 8 has, for example, an annular portion 10 and a flange portion 11 that is extended radially outward from an end portion of the annular portion 10 in an axis direction of the annular portion 10.

The extension 8 is disposed at the opening face side of the reflector 7. The annular portion 10 of the extension 8 has mirror surface-formed portions 12, 12 . . . and semi-gloss surface-formed portions 13, 13 . . . (see FIG. 2). An inner surface of each of the mirror surface-formed portions 12, 12 . . . is formed to be a mirror surface 12a, 12a . . .

Figure 2:
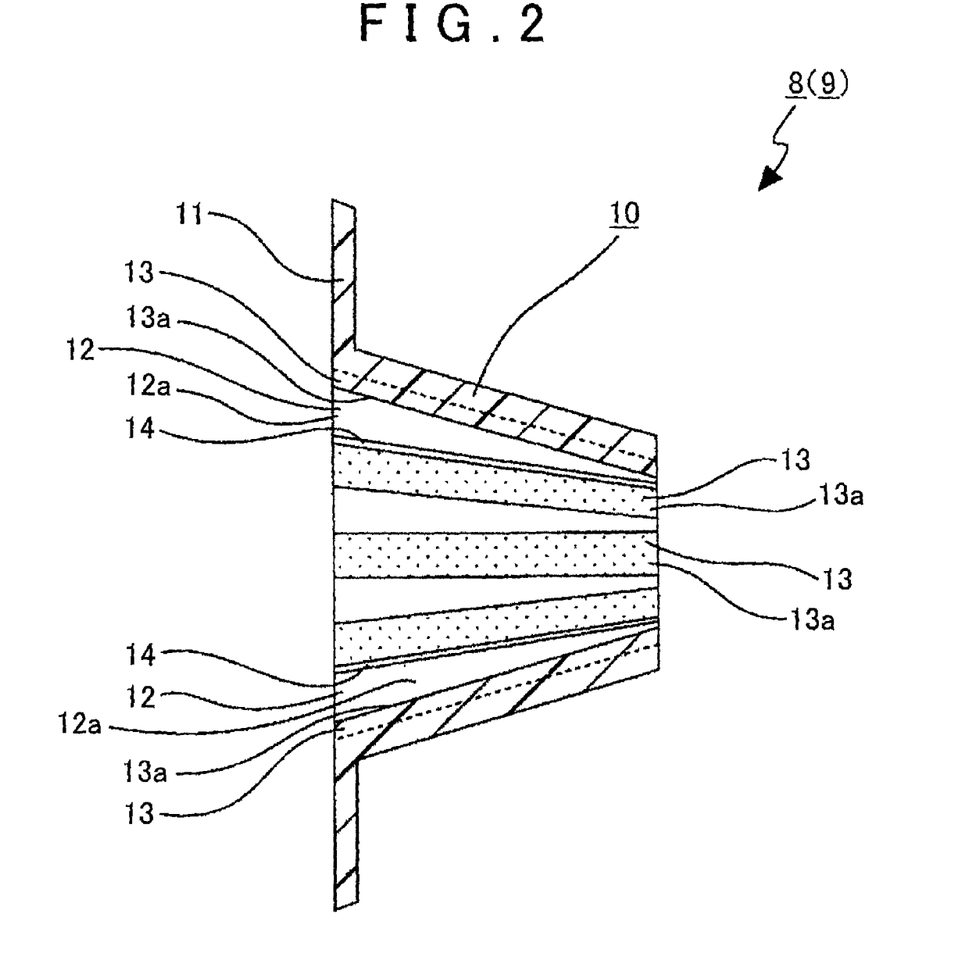
FIG. 2 is a longitudinal sectional view of an extension formed as a vehicular component part.

An inner surface of each of the semi-gloss surface-formed portions 13, 13 . . . of the extension 8 is formed to be a semi-gloss surface 13a. The semi-gloss surface 13a of each semi-gloss surface-formed portion 13 is granulated.

Step surfaces 14, 14 . . . of the extension 8 are formed between the mirror surfaces 12a, 12a . . . of the mirror surface-formed portions 12, 12 and the semi-gloss surfaces 13a, 13a . . . of the semi-gloss surface-formed portions 13, 13 . . . , and the semi-gloss surface-formed portions 13, 13 . . . are protruded inwardly of the mirror surface-formed portions 12, 12 . . . Therefore, the thickness of the semi-gloss surface-formed portions 13, 13 . . . is greater than the thickness of the mirror surface-formed portions 12, 12 . . .

The extension 8 is formed by injection molding through the use of a molding die 100 (see FIGS. 3 to 6).

Figure 3:
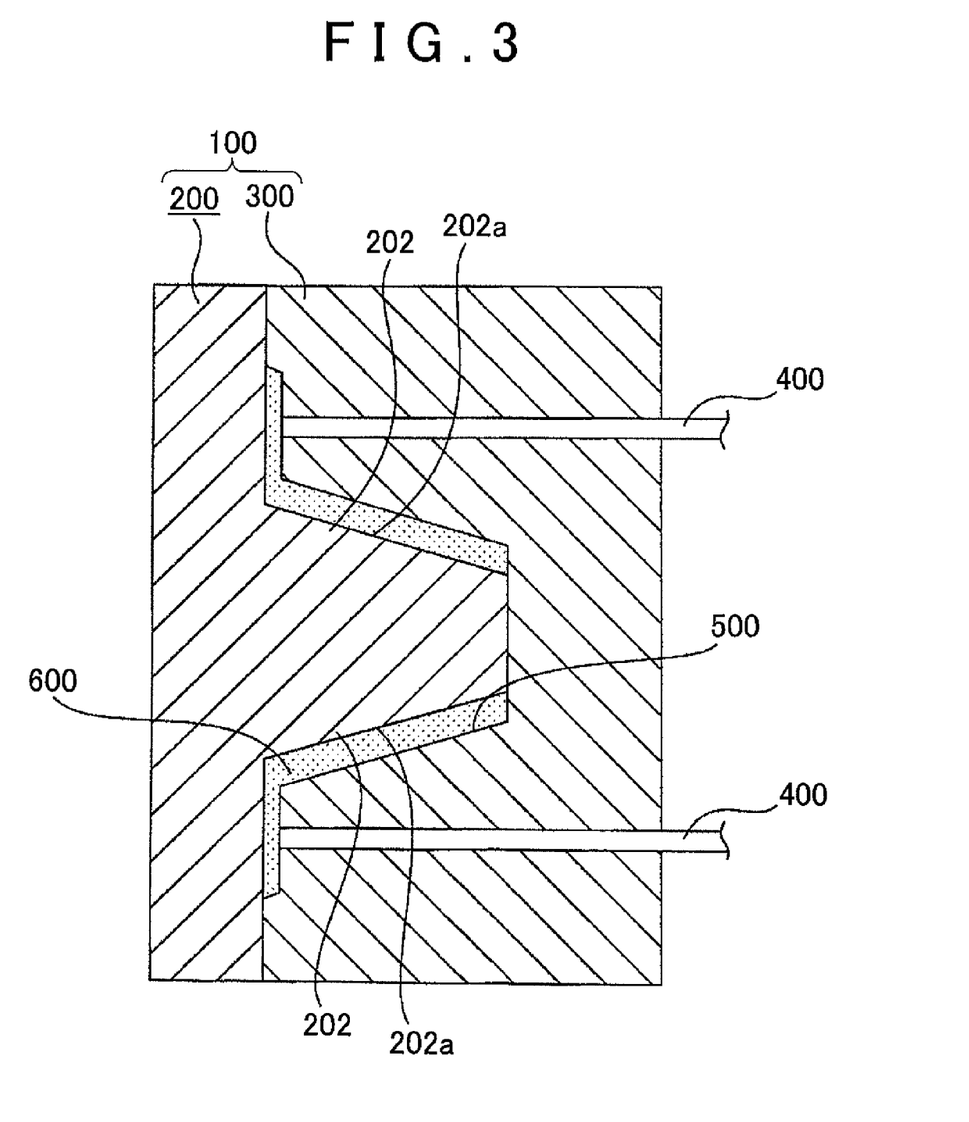
FIG. 3 is a longitudinal sectional view showing a state in which a cavity of a molding die is filled with molten resin.
Figure 4:
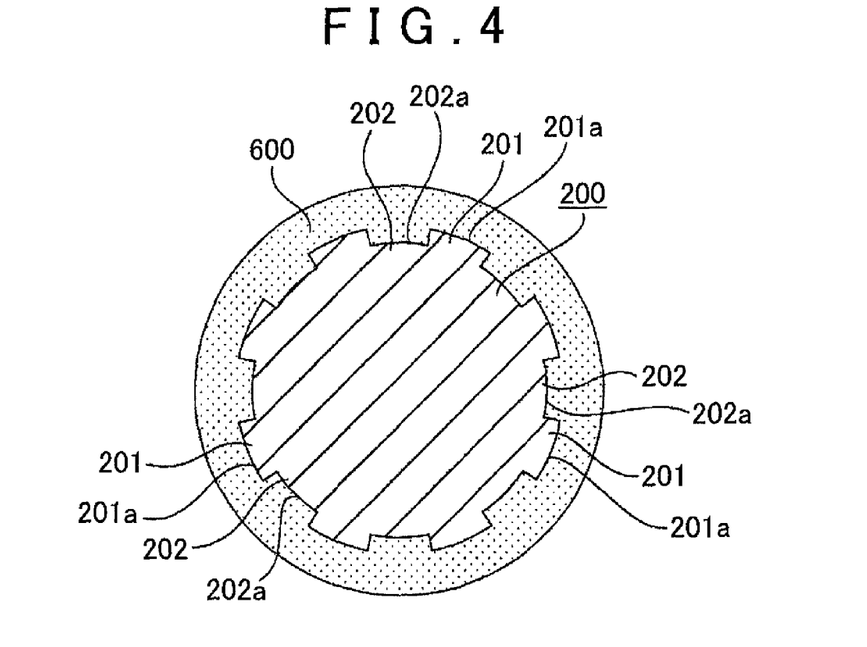
FIG. 4 is a sectional view showing a first die of the molding die in the state in which the cavity of the molding die is filled with the molten resin.

The molding die 100 has a first die 200 and a second die 300. The first die 200 is provided with mirror surface-molding portions 201, 201 . . . and semi-gloss surface-molding portions 202, 202 . . . that alternate with each other in the circumferential direction of the first die 200. An outer surface of each mirror surface-molding portion 201 of the first die 200 is formed to be a mirror surface-molding surface 201a for forming one of the mirror surfaces 12a of the extension 8. An outer surface of each semi-gloss surface-molding portion 202 is formed to be a semi-gloss surface-molding surface 202a for forming one of the semi-gloss surfaces 13a of the extension 8. Each semi-gloss surface-molding surface 202a of the first die 200 is provided with a plurality of very small protrusions for forming the grain. The semi-gloss surface-molding surfaces 202a, 202a . . . are positioned radially inwardly of the minor surface-molding surfaces 201a, 201a . . . by forming recess portions that are open radially outward between the mirror surface-molding portions 201, 201 . . .

Ejector pins 400, 400 . . . are supported in the second die 300 so as to be freely movable.

When the second die 300 is placed in proper contact with and fastened together with the first die 200, a space between the two dies is formed as a cavity 500, into which a molten resin 600 is charged (see FIGS. 3 and 4).

The molten resin 600 charged in the cavity 500 is cooled to solidify, with the pressure being maintained. In this manner, a vehicular component part 9 (extension 8) is molded. The molten resin 600 shrinks as it cools. However, since the semi-gloss surface-formed portions 13, 13 . . . are protruded on the first die 200 side relative to the mirror surface-formed portions 12, 12 . . . , with the step surfaces 14, 14 . . . formed therebetween, the mirror surface-formed portions 12, 12 . . . shrink in such a direction that the mirror surfaces 12a, 12a . . . are pressed against the mirror surface-molding surfaces 201a, 201a . . . of the first die 200, and the semi-gloss surface-formed portions 13, 13 . . . shrink in such a direction that the semi-gloss surfaces 13a, 13a . . . depart from the semi-gloss surface-molding surfaces 202a, 202a . . . of the first die 200 (see FIG. 5).

Figure 5:
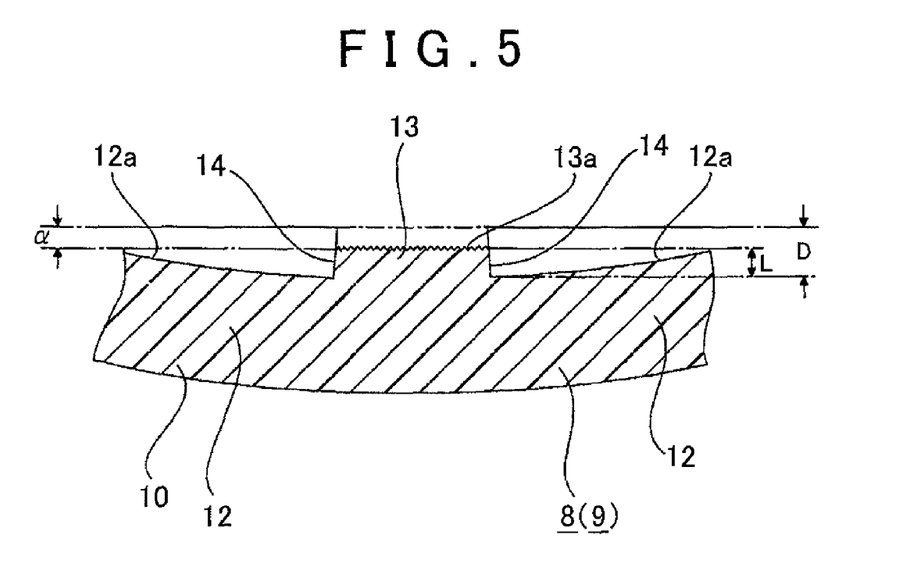
FIG. 5 shows a relation among dimensions of various portions of the vehicular component part when the molding of the vehicular component part is completed after the molten resin has shrunk.

Therefore, when the molten resin 600 has shrunk and therefore the vehicular component part 9 (extension 8) has been molded, the semi-gloss surface 13a of each semi-gloss surface-formed portion 13 has separated from a corresponding one of the semi-gloss surface-molding surfaces 202a of the first die 200.

As a result, the length L (step height L) of the step surfaces 14 between the mirror surfaces 12a and the semi-gloss surfaces 13a of the vehicular component part 9 is smaller by a shrinkage amount α than the depth D of the recess portions 203 of the first die 200, that is, the distance between the mirror surface-molding surfaces 201a and the semi-gloss surface-molding surfaces 202a. Therefore, D−α=L. The depth H of the grain formed on the semi-gloss surfaces 13a in this case is smaller than the shrinkage amount α, that is, α>H, i.e., D−L>H. In other words, the semi-gloss surfaces 13a are sufficiently separated from the semi-gloss surface-molding surfaces 202a of the first die 200. Therefore, at the time of mold release described below, the vehicular component part 9 can be suitably removed from the first die 200.

Figure 6:
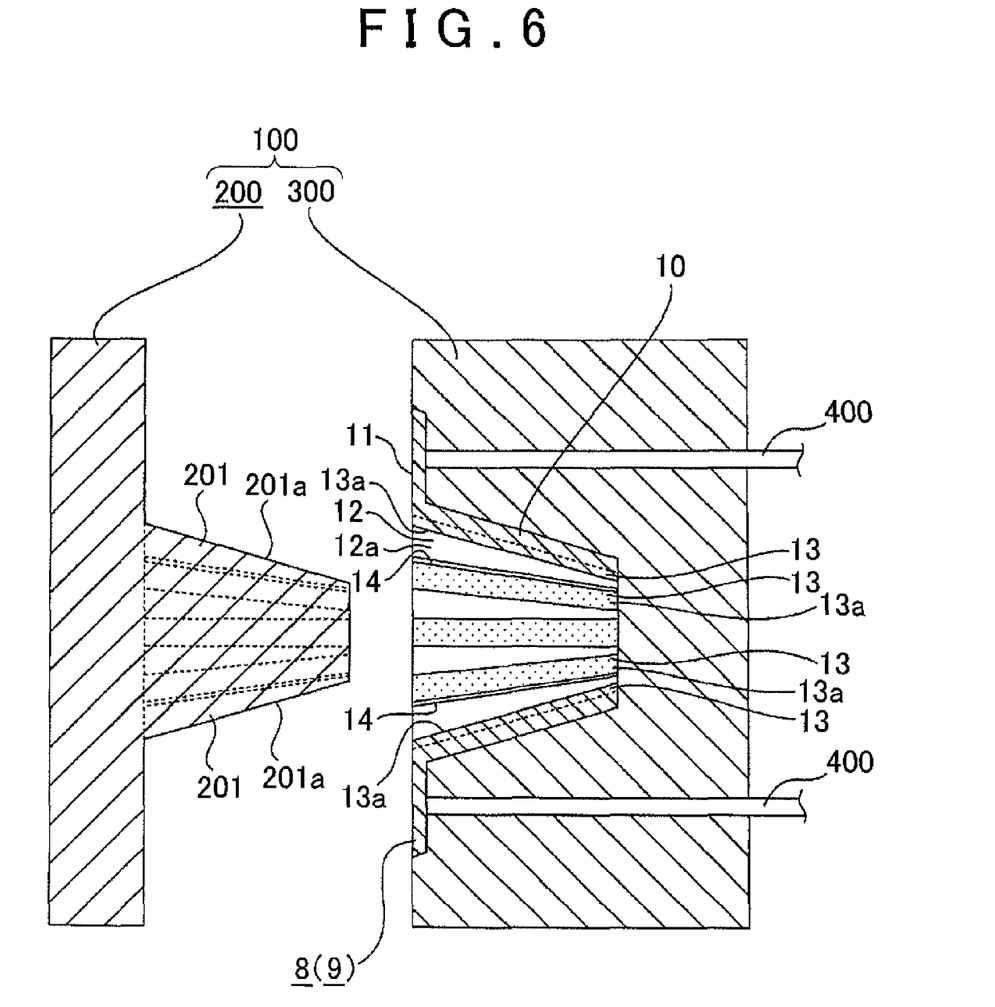
FIG. 6 is a longitudinal sectional view showing a state in which the first die and a second die are separated from each other.

After the vehicular component part 9 is molded, the second die 300 is moved so that the first die 200 and the second die 300 are separated from each other, with the vehicular component part 9 stuck to the second die 300 (see FIG. 6).

Next, the ejector pins 400, 400 . . . are used to push the vehicular component part 9 (extension 8) apart from the second die 300. The injection molding is thus completed.

As described above, the inner surface of the extension 8 formed as the vehicular component part 9 is provided with the mirror surfaces 12a, 12a and the semi-gloss surfaces 13a, 13a . . .

Experimental data regarding the molded state of the semi-gloss surfaces 13a of the extension 8 will be described below (see FIGS. 7 to 12).

Experiments were carried out by using an experimental molding die 100A that was prepared for the experiments and that had a first die 200A, a second die 300A and ejector pins 400A, 400A . . . (see FIG. 7). A vehicular component part 9A molded using the molding die 100A includes an annular portion 10A having a circular sectional shape and a flange portion 11A extending radially outward from an end portion of the annular portion 10A in the axis direction thereof. The diameter Φ of the opening face of the annular portion 10A is, for example, 160 mm, and the length S of the annular portion 10A in the axis direction is, for example, 100 mm.

Figure 7:
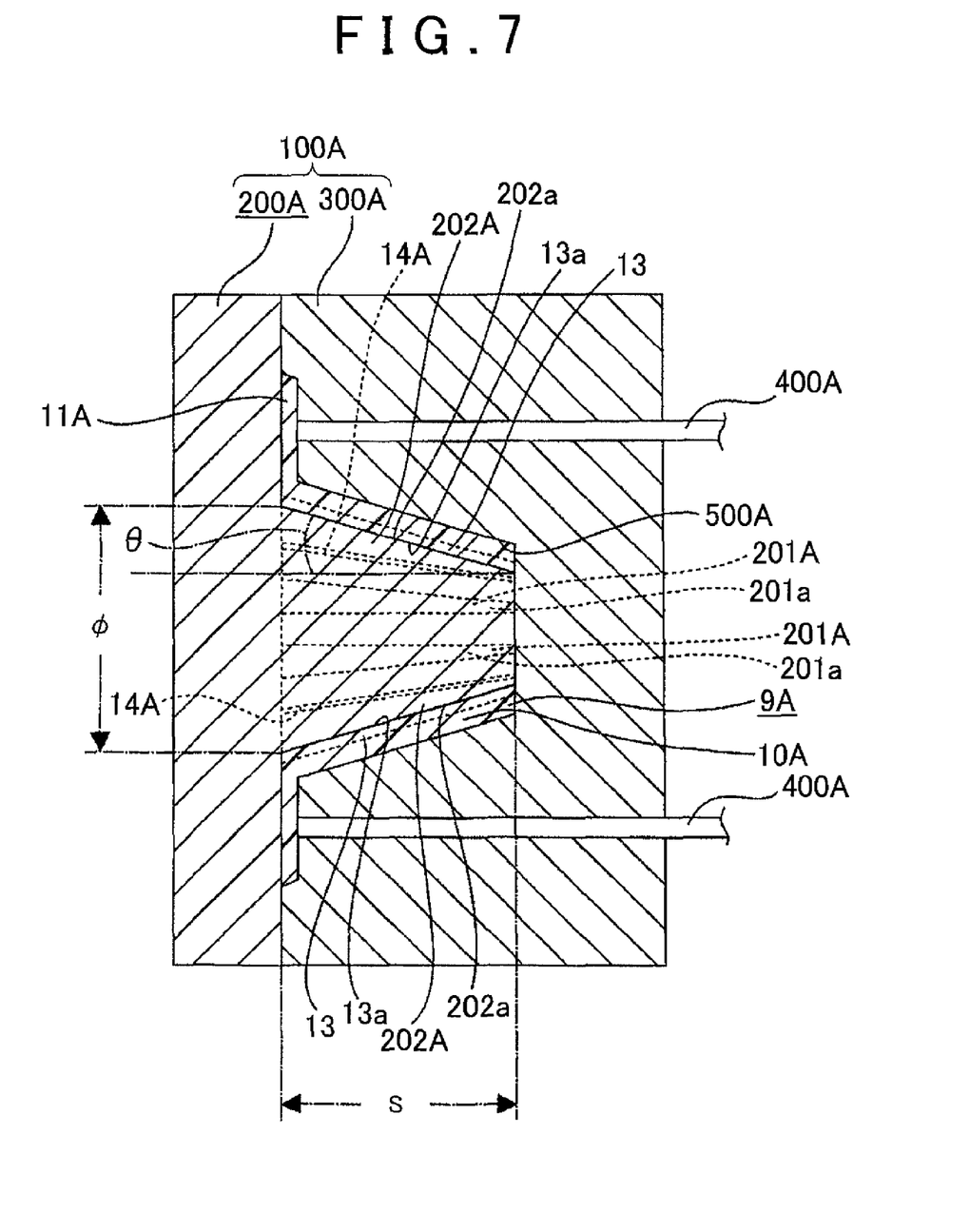
FIG. 7 is a longitudinal sectional view showing a molding die for use in experiments.

The shrinkage ratio of the resin material charged into the cavity 500A of the molding die 100A is between 4/1000 and 20/1000 inclusive.

In the experiments, the draft angle θ of the first die 200A for the vehicular component part 9A was varied, and the relation between the length L (step height L) of the step surfaces 14A between the mirror surfaces 12a and the semi-gloss surfaces 13a of the vehicular component part 9A and the depth H of the grain formed on the semi-gloss surfaces 13a was investigated and evaluated.

Figure 8:
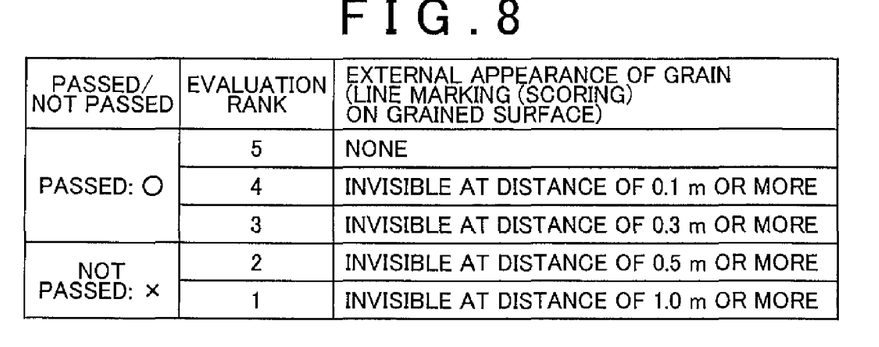
FIG. 8 is a table showing evaluation criteria adopted in experiments.

FIG. 8 is a table that shows evaluation criteria adopted in the experiments, showing evaluation ranks according to whether the scoring, that is, line marking, was visually observed on any of the semi-gloss surfaces 13a. The evaluation ranks are five levels of 1 to 5, and the evaluation ranks of 3 and higher are regarded as being acceptable or passed. The numbers of 1 to 5 in FIGS. 9 to 12 show evaluation ranks.

Figure 9:
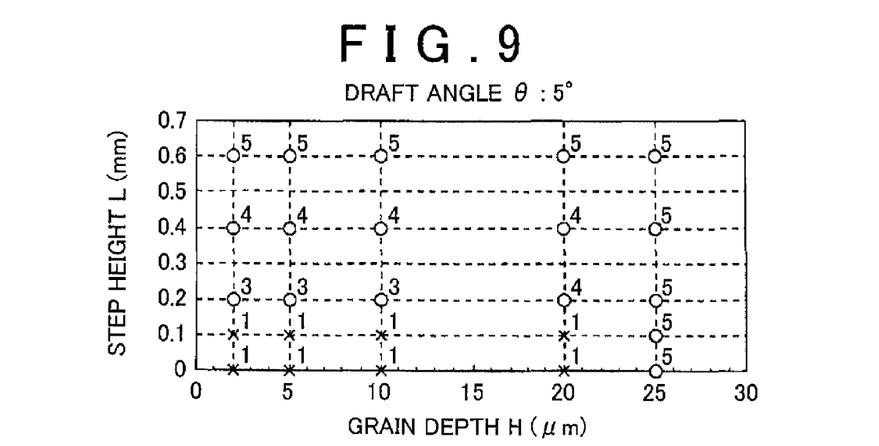
FIG. 9 is a graph showing a relation between step height L and grain depth H when the draft angle θ is 5°.

FIG. 9 is a graph showing a relation between the step height L and the grain depth H when the draft angle θ was 5°. When the draft angle θ was 5°, good molded states of vehicular component parts 9 were securely obtained in the cases where the step height L was greater than or equal to 0.2 mm and the grain depth H was greater than or equal to 25 μm.

Figure 10:
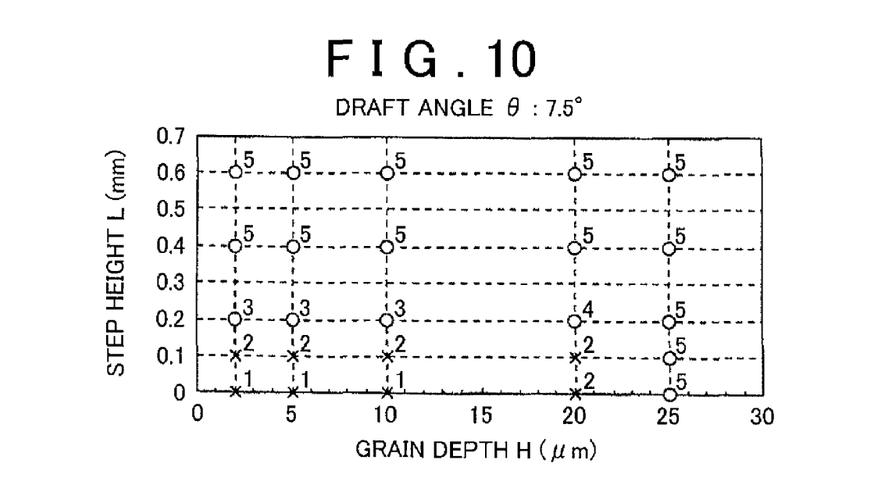
FIG. 10 is a graph showing a relation between step height L and grain depth H when the draft angle θ is 7.5°.

FIG. 10 is a graph showing a relation between the step height L and the grain depth H when the draft angle θ was 7.5°. When the draft angle θ was 7.5°, good molded states of vehicular component parts 9 were securely obtained in the cases where the step height L was greater than or equal to 0.2 mm and the grain depth H was greater than or equal to 25 μm.

Figure 11:
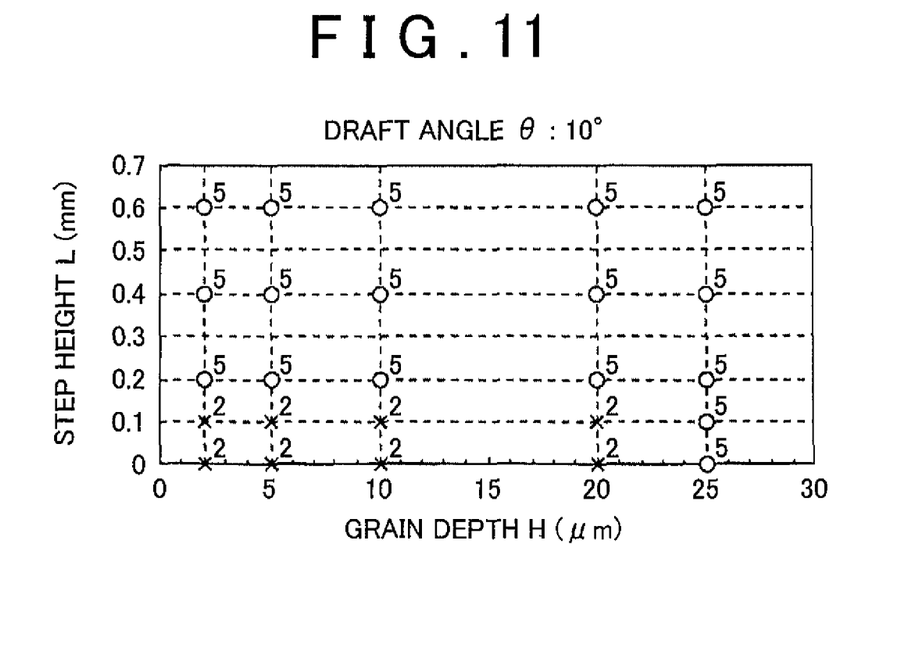
FIG. 11 is a graph showing a relation between step height L and grain depth H when the draft angle θ is 10°.

FIG. 11 is a graph showing a relation between the step height L and the grain depth H when the draft angle θ was 10°. When the draft angle θ was 10°, good molded states of vehicular component parts 9 were securely obtained in the cases where the step height L was greater than or equal to 0.2 mm and the grain depth H was greater than or equal to 25 μm.

Figure 12:
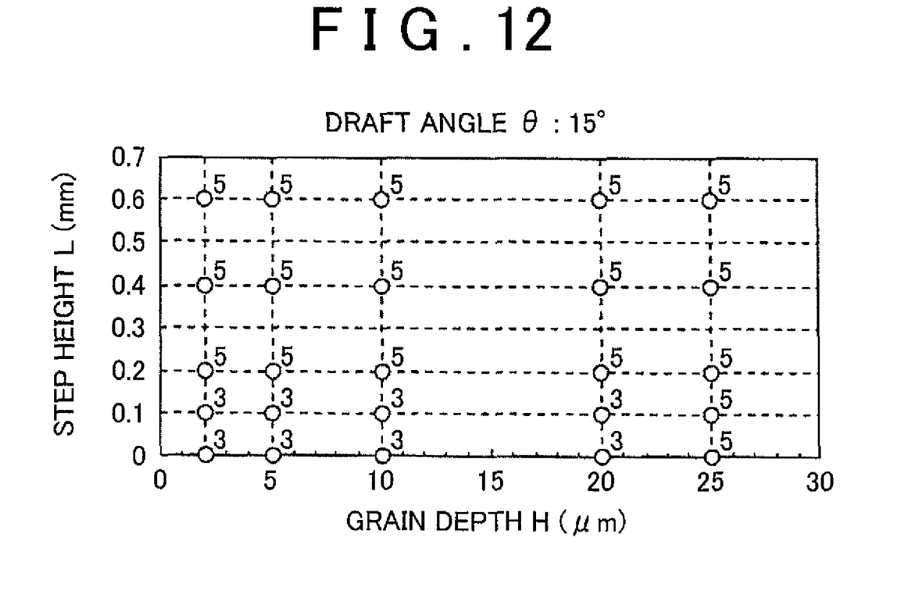
FIG. 12 is a graph showing a relation between step height L and grain depth H when the draft angle θ is 15°.

FIG. 12 is a graph showing a relation between the step height L and the grain depth H when the draft angle θ was 15°. When the draft angle θ was 15°, good molded states of vehicular component parts 9 were securely obtained in the cases where the step height L was greater than or equal to 0 mm and the grain depth H was greater than or equal to 2 μm. Therefore, when the draft angle θ was 15°, good molded states of vehicular component parts 9 were securely obtained even in the cases where no step surfaces 14, 14 . . . were formed.

As described above, in the vehicular lamp 1, the step surfaces 14, 14 . . . are formed between the mirror surfaces 12a, 12a . . . and the semi-gloss surfaces 13a, 13a . . . of the vehicular component part 9, and the semi-gloss surface-formed portions 13, 13 . . . are protruded on the first die 200 side relative to the mirror-surface formed portions 12, 12 . . .

Hence, when the molten resin 600 is cooled, shrinkage occurs so that the semi-gloss surfaces 13a, 13a . . . of the semi-gloss surface-formed portions 13, 13 . . . depart from the semi-gloss surface-molding surfaces 202a, 202a . . . of the first die 200. Therefore, when the first die 200 and the second die 300 are separated from each other, the contact of the semi-gloss surfaces 13a, 13a . . . with protrusions provided on the semi-gloss surface-molding surfaces 202a, 202a of the first die 200 is less likely to occur and therefore the scoring, that is, the line marking, is less likely to occur. Thus, a good molded state of the vehicular component part 9 can be secured without a need to increase the draft angle of the first die 200 for the vehicular component part 9.

Besides, since the semi-gloss surface-formed portions 13, 13 . . . of the vehicular component part 9 are formed so as to have a greater wall thickness than the mirror surface-formed portions 12, 12 . . . , the shrinkage amount of the semi-gloss surface-formed portions 13, 13 . . . at the time of cooling the molten resin 600 is larger than the shrinkage amount of the mirror surface-formed portions 12, 12 . . . , and therefore the amount of separation of the semi-gloss surfaces 13a, 13a . . . from the semi-gloss surface-molding surfaces 202a, 202a . . . becomes large.

Therefore, the scoring, that is, the line marking, is even less likely to occur on the vehicular component part 9, and an even better molded state of the vehicular component part 9 can be secured, in comparison with the related art.

Furthermore, in the case where the mirror surfaces 12a, 12a . . . and the semi-gloss surfaces 13a, 13a . . . are formed on an internal surface of the vehicular component part 9, the vehicular component part 9 can be easily detached from the first die 200 at the time of mold release because the semi-gloss surfaces 13a, 13a . . . have separated from the semi-gloss surface-molding surfaces 202a, 202a . . . by that time.

In addition, when the grain depth H is less than or equal to 20 μm and the step height L is between 0.2 mm and 0.6 mm inclusive, it is possible to form the vehicular component part 9 in a good molded state with restrained occurrence of the scoring. The shrinkage ratio of the resin material for the vehicular component part 9 may be between 4/1000 and 20/1000 inclusive. The draft angle θ of the first die 200 for the vehicular component part 9 may be between 5° and 10° inclusive.

The configurations and structures of the various portions shown above in conjunction with embodiments of the invention are merely examples of concrete embodiments in carrying out the invention, and the technical scope of the invention should not be construed to be limited to these embodiments.

The semi-gloss surface-formed portions may be provided with a greater wall thickness than the mirror surface-formed portions.

According to this construction, a large amount of separation of the semi-gloss surfaces from the semi-gloss surface-molding surfaces is obtained when the molten resin is cooled, and therefore the scoring, that is, the line marking, is less likely to occur on the vehicular component part. Thus, an even better molded state of the vehicular component part can be secured.

Furthermore, the mirror surfaces and the semi-gloss surfaces may be formed on the internal surface of the vehicular component part.

According to this construction, even in the case where the mirror surfaces and the semi-gloss surfaces are formed on the internal surface of the vehicular component part, the first die and the vehicular component part can easily be separated from each other at the time of mold release because the semi-gloss surfaces have already become apart from the semi-gloss surface-molding surfaces when the vehicular component part is to be removed.

Furthermore, the semi-gloss surfaces may be grained, the grain depth of the semi-gloss surfaces may be less than or equal to 20 μm, and the length of the step surfaces between the mirror surfaces and the semi-gloss surfaces may be between 0.2 mm and 0.6 mm inclusive. The shrinkage ratio of the material for the vehicular component part may be between 4/1000 and 20/1000 inclusive. The draft angle of the first die for the vehicular component part may be between 5° and 10° inclusive.

According to this construction, it is possible to form a vehicular component part in a good molded state with restrained occurrence of scoring, that is, line marking.

It suffices that one of the first die and the second die is movable relative to the other, and the die provided with the mirror surface-molding portions and the semi-gloss surface-molding portions may be either a stationary die or a movable die.

What is claimed is:

1. A vehicular lamp comprising a vehicular component part that is molded by charging molten resin into a cavity defined by a first die that has a mirror surface-molding portion and a semi-gloss surface-molding portion and a second die that is movable relative to the first die and cooling the molten resin, wherein:
    the vehicular component part includes a mirror surface-formed portion having a mirror surface that is formed by the mirror surface-molding portion and a semi-gloss surface-formed portion having a semi-gloss surface that is formed by the semi-gloss surface-molding portion;
    a step surface is provided between the mirror surface and the semi-gloss surface of the vehicular component part; and
    the semi-gloss surface-formed portion is protruded on a first die side relative to the mirror surface-formed portion.

2. The vehicular lamp according to claim 1, wherein the semi-gloss surface-formed portion is thicker than the mirror surface-formed portion.

3. The vehicular lamp according to claim 1, wherein the mirror surface and the semi-gloss surface are formed on an internal surface of the vehicular component part.

4. The vehicular lamp according to claim 1, wherein:
    the semi-gloss surface is grained;
    a grain depth of the semi-gloss surface is less than or equal to 20 μm; and
    a length of the step surface between the mirror surface and the semi-gloss surface is between 0.2 mm and 0.6 mm inclusive.

5. The vehicular lamp according to claim 4, wherein a shrinkage ratio of a material for the vehicular component part is between 4/1000 and 20/1000 inclusive.

6. The vehicular lamp according to claim 4, wherein a draft angle of the first die for the vehicular component part is between 5° and 10° inclusive.

7. An vehicular component part that is made of resin and for use in a vehicular lamp, comprising
    an annular portion including a mirror surface-formed portion whose inner surface is a mirror surface and a semi-gloss surface-formed portion whose inner surface is a semi-gloss surface, wherein
    a step surface is provided between the mirror surface and the semi-gloss surface, and
    the semi-gloss surface-formed portion is protruded relative to the mirror surface-formed portion.

8. The vehicular component part according to claim 7, wherein
    the semi-gloss surface-formed portion is thicker than the mirror surface-formed portion.

9. The vehicular component part according to claim 7, wherein
    the mirror surface and the semi-gloss surface are formed on an internal surface of the vehicular component part.

10. The vehicular component part according to claim 7, wherein:
    the semi-gloss surface is grained;
    a grain depth of the semi-gloss surface is less than or equal to 20 μm; and
    a length of the step surface between the mirror surface and the semi-gloss surface is between 0.2 mm and 0.6 mm inclusive.

11. The vehicular component part according to claim 10, wherein
    a shrinkage ratio of a material for the vehicular component part is between 4/1000 and 20/1000 inclusive.

12. The vehicular component part according to claim 10, wherein
    a draft angle of the first die for the vehicular component part is between 5° and 10° inclusive.

13. A vehicular lamp comprising the vehicular component part according to claim 7.

14. A method of producing a vehicular component part for use in a vehicular lamp, comprising:
    charging molten resin into a cavity defined by a first die that has a semi-gloss surface-molding portion and a mirror surface-molding portion and a second die that is movable relative to the first die; and
    removing a molding that is the vehicular component part from the first die and the second die after the molten resin is cooled, wherein:
- a step surface-molding portion that forms a step surface between the mirror surface and the semi-gloss surface of the vehicular component part is provided between the mirror surface-molding portion and the semi-gloss surface-molding portion of the first die; and
- the mirror surface-molding portion of the first die is protruded relative to the semi-gloss surface-molding portion of the first die.

15. The method according to claim 14, wherein the semi-gloss surface-formed portion is thicker than the mirror surface-formed portion.

16. The method according to claim 14, wherein:
the mirror surface and the semi-gloss surface are formed on an internal surface of the vehicular component part.

17. The method according to claim 14, wherein:
the semi-gloss surface is grained;
a grain depth of the semi-gloss surface is less than or equal to 20 µm; and
a length of the step surface between the mirror surface and the semi-gloss surface is between 0.2 mm and 0.6 mm inclusive.

18. The method according to claim 17, wherein a shrinkage ratio of a material for the vehicular component part is between 4/1000 and 20/1000 inclusive.

19. The method according to claim 17, wherein a draft angle of the first die for the vehicular component part is between 5° and 10° inclusive.

* * * * *